Figure 1:
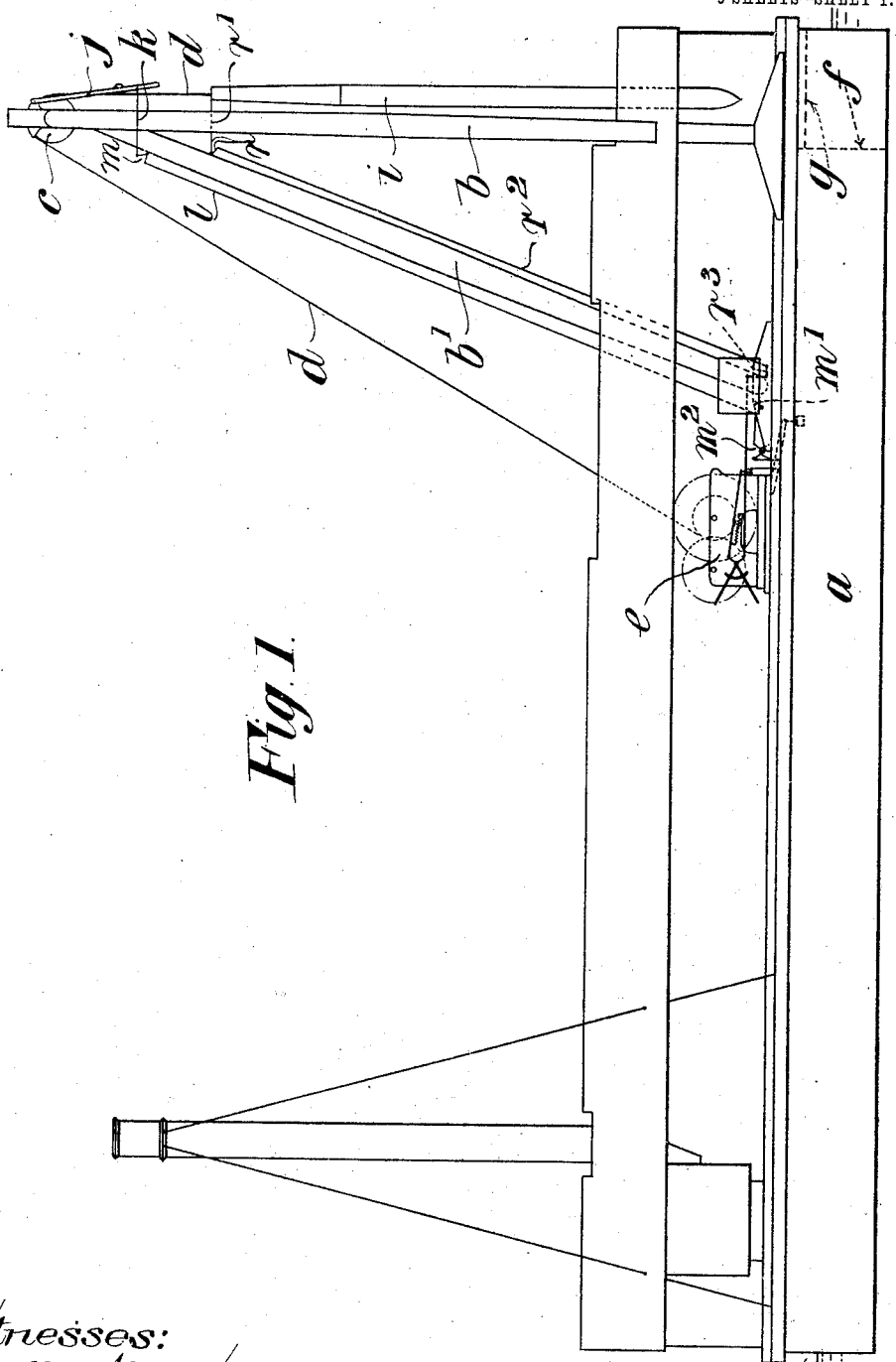

No. 874,217. PATENTED DEC. 17, 1907.
F. LOBNITZ.
APPARATUS FOR BREAKING ROCKS, &c.
APPLICATION FILED APR. 30, 1906.

9 SHEETS—SHEET 1.

Witnesses:
P. F. Nagle
L. Douville

Inventor:
Fred Lobnitz
By Diebersheim + Fairbanks
Attorneys

No. 874,217. PATENTED DEC. 17, 1907.
F. LOBNITZ.
APPARATUS FOR BREAKING ROCKS, &c.
APPLICATION FILED APR. 30, 1906.

9 SHEETS—SHEET 2.

No. 874,217. PATENTED DEC. 17, 1907.
F. LOBNITZ.
APPARATUS FOR BREAKING ROCKS, &c.
APPLICATION FILED APR. 30, 1906.

9 SHEETS—SHEET 4.

Witnesses:
Inventor:
By
Attorneys.

No. 874,217. PATENTED DEC. 17, 1907.
F. LOBNITZ.
APPARATUS FOR BREAKING ROCKS, &c.
APPLICATION FILED APR. 30, 1906.

9 SHEETS—SHEET 5.

Witnesses:
P. F. Nagle.
L. Douville.

Inventor.
Fred Lobnitz.
By Wiederscheim + Fairbanks,
Attorneys.

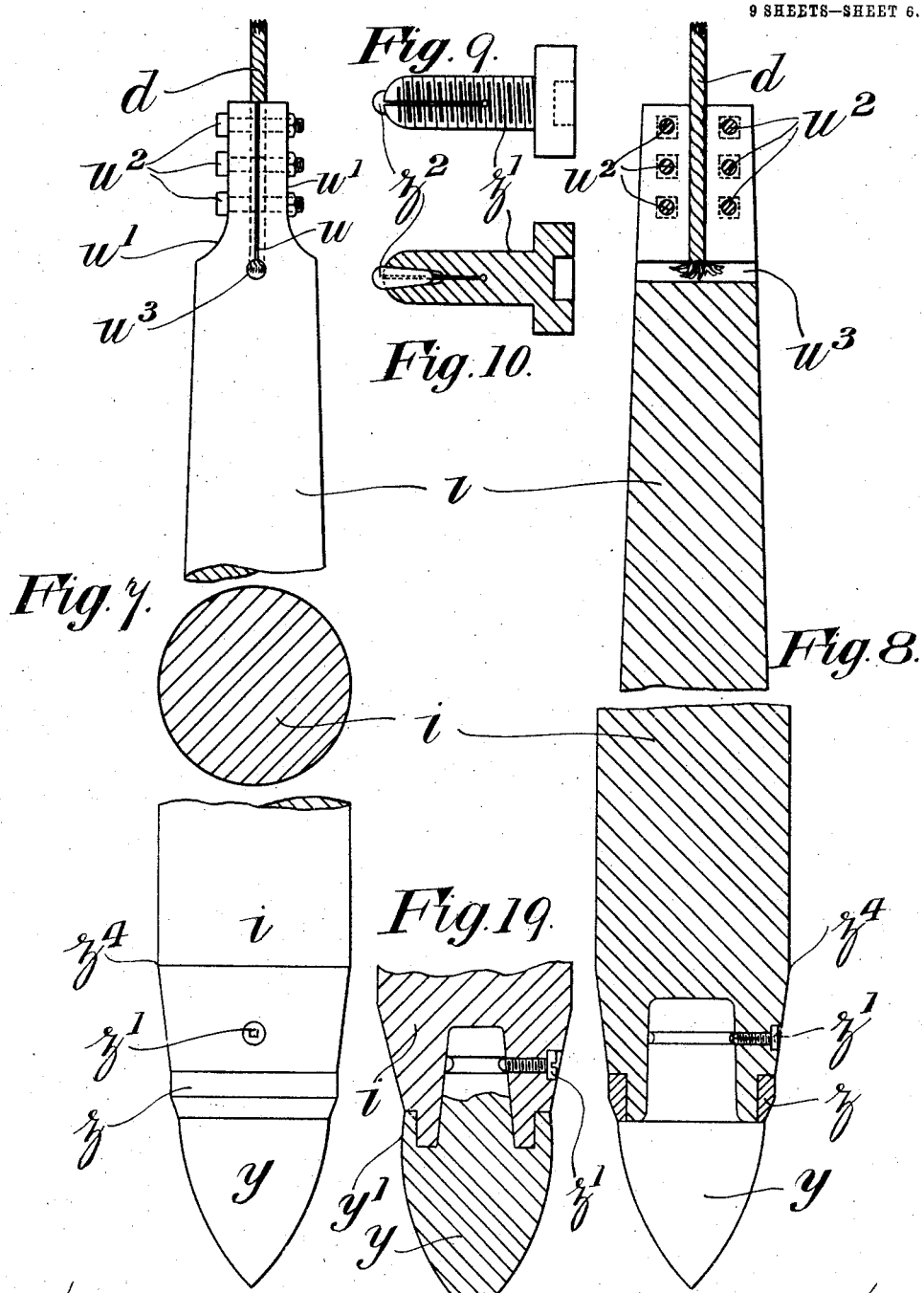

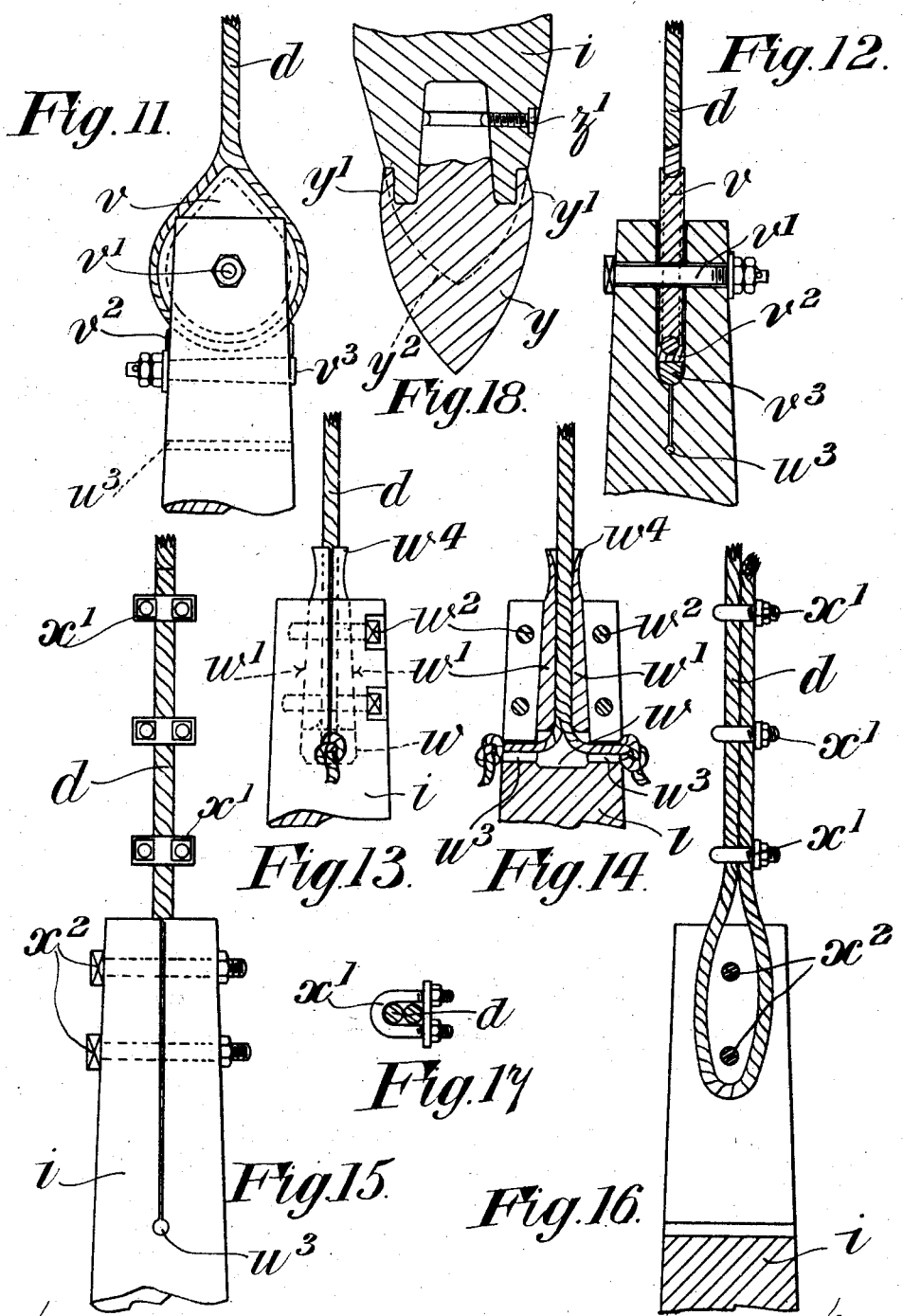

No. 874,217. PATENTED DEC. 17, 1907.
F. LOBNITZ.
APPARATUS FOR BREAKING ROCKS, &c.
APPLICATION FILED APR. 30, 1906.
9 SHEETS—SHEET 8.
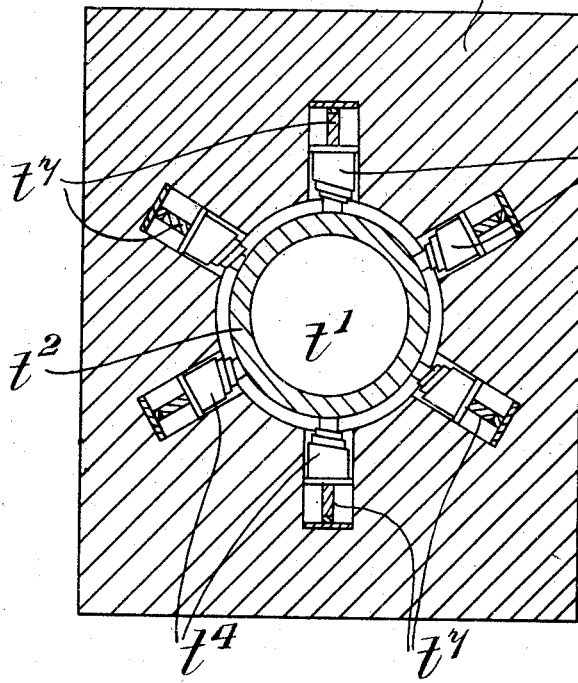
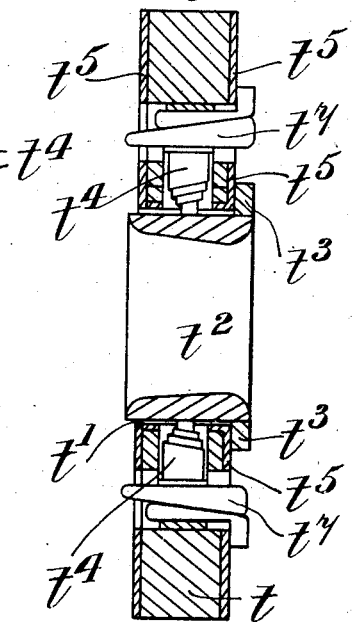
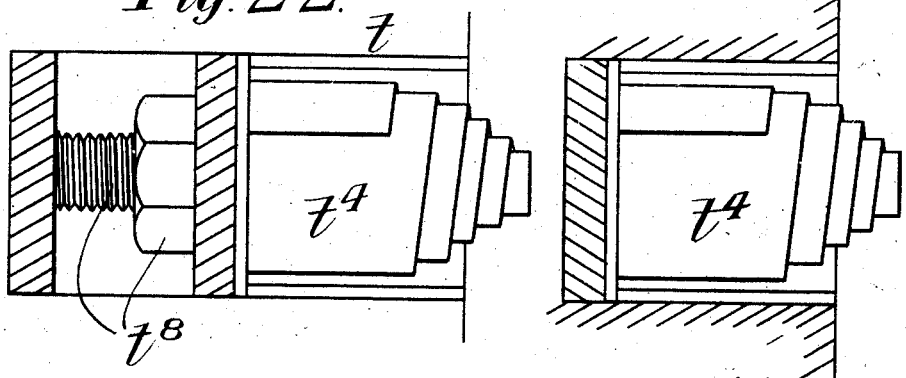
Witnesses:
P. F. Nagle.
L. Douville.
Inventor
Fred Lobnitz.
By Wiedersheim + Fairbank
Attorneys.

No. 874,217. PATENTED DEC. 17, 1907.
F. LOBNITZ.
APPARATUS FOR BREAKING ROCKS, &c.
APPLICATION FILED APR. 30, 1906.

9 SHEETS—SHEET 9.

Witnesses:
P. F. Nagle
L. Couville

Inventor:
Fred Lobnitz
By Wiedersheim + Fairbanks
Attorneys

UNITED STATES PATENT OFFICE.

FRED LOBNITZ, OF RENFREW, SCOTLAND.

APPARATUS FOR BREAKING ROCKS, &c.

No. 874,217.  Specification of Letters Patent.  Patented Dec. 17, 1907.

Application filed April 30, 1906. Serial No. 314,488.

*To all whom it may concern:*

Be it known that I, FRED LOBNITZ, of Clarence House, Renfrew, Scotland, engineer and shipbuilder, have invented certain new and useful Improvements in Apparatus for Breaking Up or Cutting Rocks, Stones, or Earth under Water or on Land, of which the following is a specification.

This invention relates to apparatus for breaking up or cutting rocks, boulders, stones, or hardened earth, or combinations of earth and stone, whether under water or on dry land.

The apparatus is specially adapted for use in conjunction with, or as an auxiliary to, dredging plant when forming or deepening rivers, canals, harbors, and other waterways, and also for breaking up or disintegrating the ground when making excavations on dry land for railways, foundations, and other formations and structures.

In apparatus of this kind it is usual to employ one or more rock cutters or rams of special construction and which weigh from 5 to 20 tons, or so, each. Each cutter, if there are several, is raised, by means of a winch and wire rope arrangement, to a certain height and is then allowed to fall on to the rock, with the result, that, owing to its great weight and peculiar construction, it penetrates the rock, partly pulverizing and partly breaking it. If the rock is hard and brittle, it breaks in a similar manner to a piece of glass struck by a heavy hammer. The cutter is frequently raised and allowed to fall so as to give a series of percussive blows to the rock with the result that it is soon shattered and broken up to the depth desired.

The whole apparatus usually comprises a rock cutter (or cutters), guides for the cutter, winding gear for hoisting the cutter and then allowing it to fall, and sheer legs or other suitable structure for carrying the pulley (or pulleys) upon which the lifting rope (or ropes) runs.

For sub-aqueous work the rock cutting apparatus is preferably carried by a suitable floating structure such as a barge, or a dredger, or, say, two old barges joined together by logs of wood or steel girders bolted across on top of their decks. The barge or other floating structure is provided with a maneuvering winch and chains (or wire ropes) whereby it can be readily moved about so as to enable the blows of the cutter to be delivered at the exact spot desired or within a few inches of it.

Figure 2:
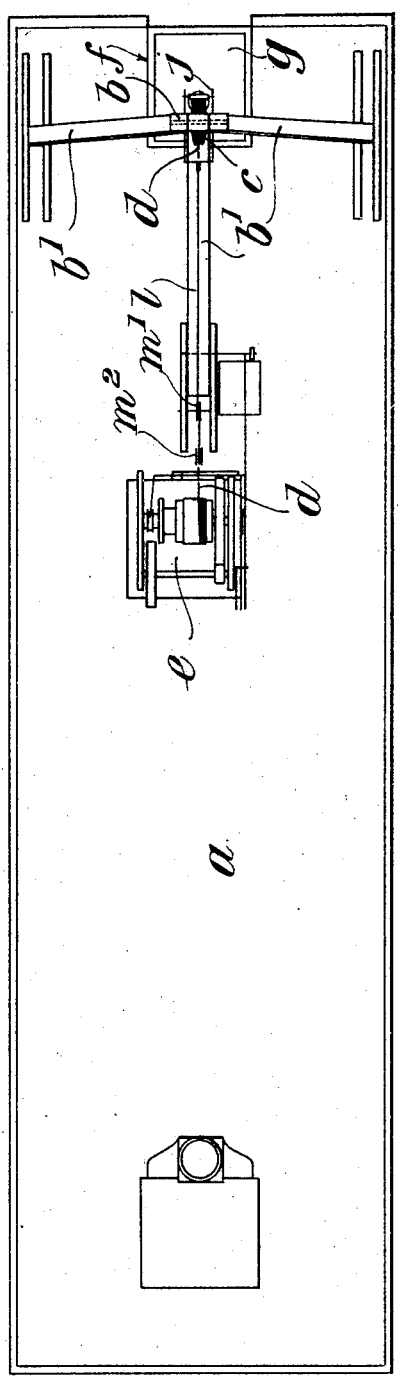
Figure 3:
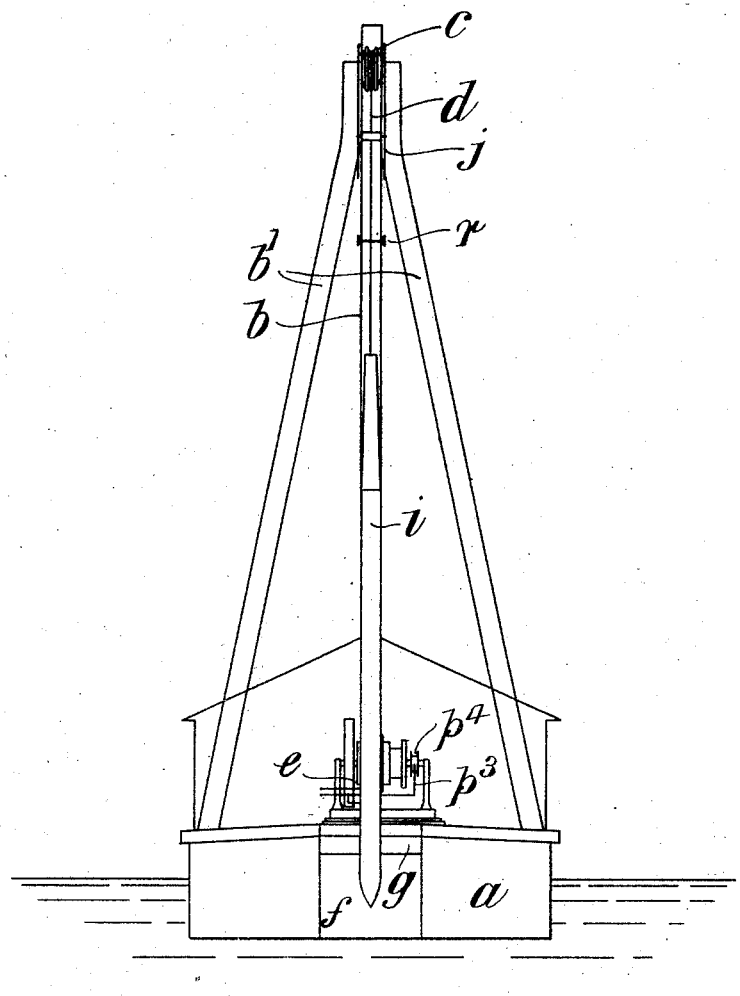
Figure 4:
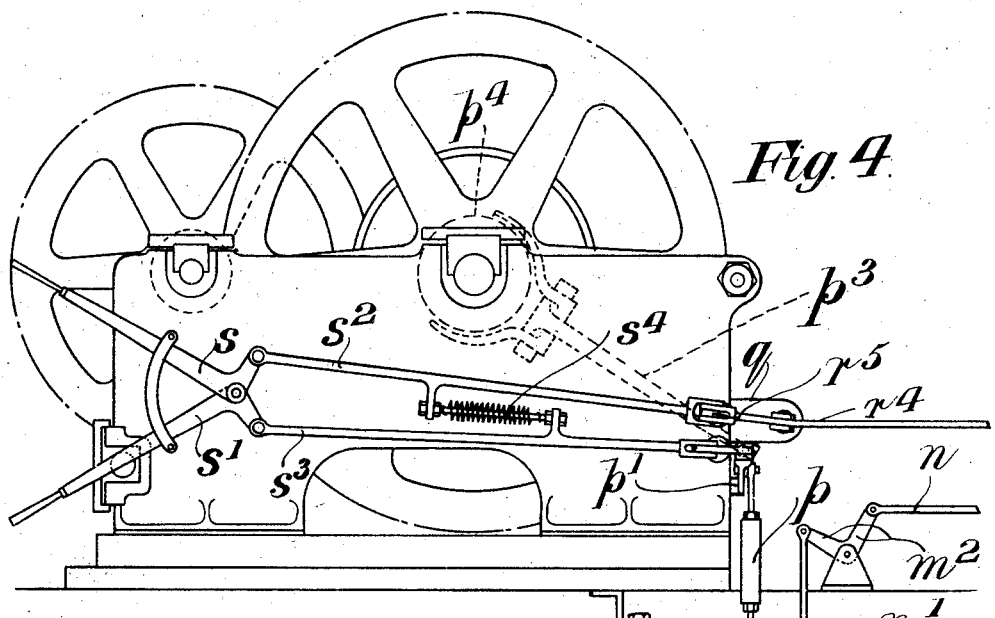
Figure 24:
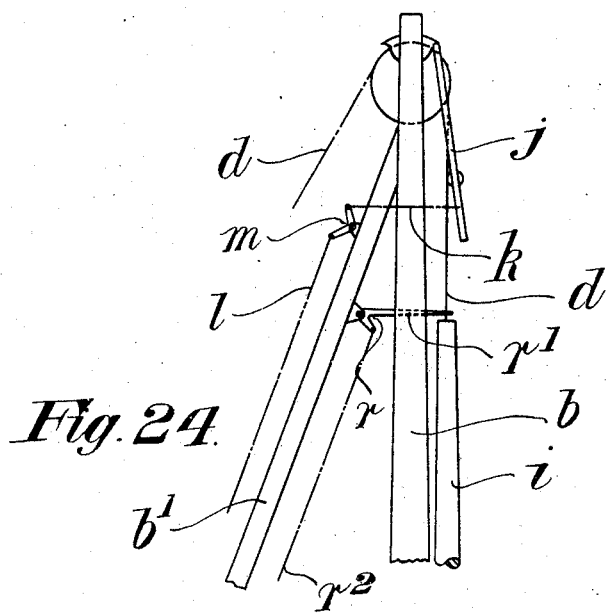
Figure 25:
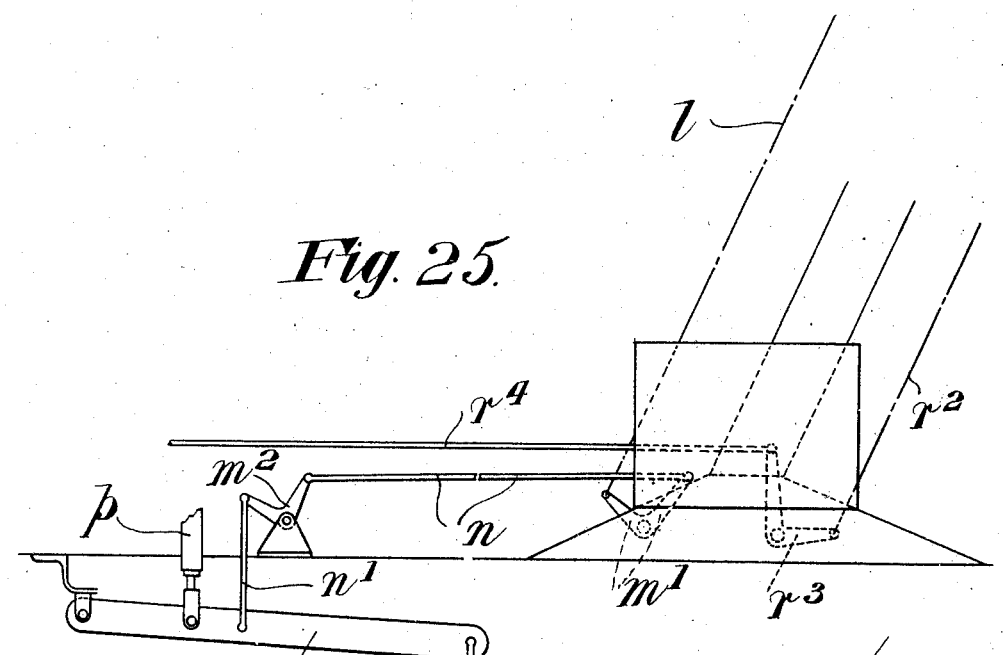

On the drawings annexed I have shown in Figures 1 to 3 a rock cutting vessel having a single cutter at the bow. Fig. 1 is a side view, Fig. 2 a plan and Fig. 3 a bow view of the vessel. Fig. 4 is a side view, Fig. 5 a plan view and Fig. 6 an end view of a hoisting winch with lever gear for operating the clutch and steam valve. Fig. 7 is a view of the cutter itself. It is broken away at the center. Fig. 8 is a section thereof. Figs. 9 and 10 show, respectively, in side elevation and section a locking pin or screw. Figs. 11 and 12, show, respectively, in side view and section a modified form of the cutter end or top. Figs. 13 and 14 show, respectively, in side view and section, a second modified form of the cutter end or top. Figs. 15 and 16 are similar views of a third modification. Fig. 17 is a plan view of a clip. Figs. 18 and 19 show sections of cutter points. Fig. 20 is a plan view of a guide. Fig. 21 is a cross section thereof. Figs. 22 and 23 show buffer springs for the guide. Fig. 24 is an enlarged detail view of part of the apparatus. Fig. 25 is a view of part of the lever gear connections.

On the drawings the same reference letters wherever repeated indicate the same parts.

Before entering upon a detailed description of my invention I may say that Figs. 1, 2, and 3, will give a general idea of the nature of this kind of apparatus. It will be seen that there is a vessel $a$ which has a structure $b$ erected upon it said structure being supported by stays $b^1$. At the top of the structure is a pulley $c$ over which passes a steel wire rope $d$, the rope being connected to a cutter $i$ on the one hand and passing to a hoisting winch $e$ on the other hand. The ship is made with a well $f$ in which is a guide $g$ having a guide hole therein. The cutter can be raised up by the winch and then allowed to fall so as to shatter or break up the subaqueous rock.

I will now proceed to fully and clearly describe my invention which consists of various improvements as hereafter set forth.

In order that the rock cutting apparatus may be worked as efficiently and cheaply as possible it is necessary that the blows given by the rock cutter should be delivered in quick succession. At present the rock cutter is raised up by the action of a steam winch provided with a winding drum which, when the cutter is to be raised, is clutched to the winch shaft, and, when the cutter is to be lowered, is unclutched and allowed to run freely so as to pay out the rope attached to the cutter as the latter falls down and strikes the rock. The clutch used is preferably a coil clutch which the winch man operates by means of a hand lever.

In order to save time in the raising of the rock cutter after each blow, it is usual for the winch man to clutch the winch drum to its shaft as soon as possible after the cutter has struck the rock so as to avoid any unnecessary slackening or paying out of the rope attached to the cutter. To actuate the clutch always at the proper times requires watchfulness combined with care and judgment on the part of the winch man. In my prior patent specifications Nos. 707128 of 1902 and 789981 of 1905 I described how the kinking or slackening of the rope at each blow of the cutter could be utilized to automatically apply the clutch so that the cutter could be raised up after each blow without loss of time and I now propose to use the arrangement for automatically applying the clutch along with an arrangement for automatically releasing the clutch and also opening and closing the steam supply valve of the winch for the purpose of enabling the cutter to be raised and dropped automatically. Such automatic arrangement would be specially useful in the case of a vessel having a battery of cutters as one or more of the cutters could be switched on or put in operation as desired and then allowed to operate automatically until switched off again. The mechanism constituting this part of my invention is illustrated at Figs. 1, 2, 3, 4, 5, 6, 24 and 25. I use, as in my prior specification, No. 789981 of 1905, a swinging lever $j$ which has a roller resting against the hoisting rope $d$ and when the kinking or slackening takes place the lever $j$ moves, along with the ropes $k$, $l$, bell cranks $m$, $m^1$, $m^2$, and rods $n$, $n^1$ (Fig. 25) so as to allow the weighted lever $o$ to fall and thereby through the connection $p$, bell crank $p^1$, (Fig. 6) rod $p^2$, and lever $p^3$ apply the clutch $p^4$. The clutch being in gear the cutter can now be hoisted again by opening the steam valve $q$ of the winch and this is performed automatically shortly after the clutch has been applied by means of the arm $q^1$ on the rod $p^2$ which, when the rod moves in the direction of the arrow (see Fig. 6) so as to apply the clutch compresses the spring $q^2$ and causes it to actuate the valve rod $q^3$. The interposition of the spring insures that the valve rod shall not be moved simultaneously with the rod $p^2$ but at a slight interval thereafter. The steam valve being opened and the clutch applied, the winch, at once winds up the hoisting rope and raises the cutter and when the top of the latter reaches a certain height it strikes against the long arm $r^1$ of a bell crank lever $r$ (see Fig. 24) thereby pulling the rope $r^2$ and actuating the bell crank $r^3$ and rod $r^4$ so as to pull, by means of the bell crank $r^5$ (see Fig. 5) the rod $q^3$ and close the steam valve $q$. The movement of the valve rod acts on the spring $q^2$ and causes it to push back, after a slight interval, the rod $p^2$ and disengage the clutch with the result that the cutter drops for another blow. These movements automatically continue until it is desired to stop the mechanism which can be done by cutting off the steam supply or by disengaging the mechanism.

Figure 5:
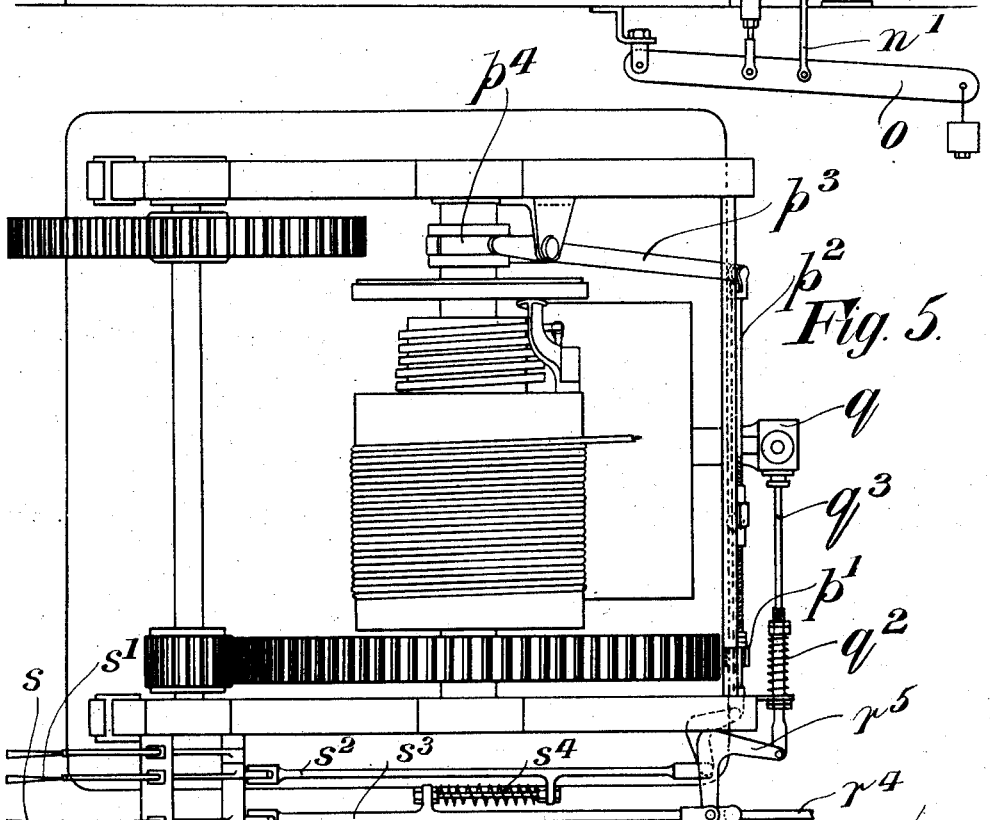
Figure 6:
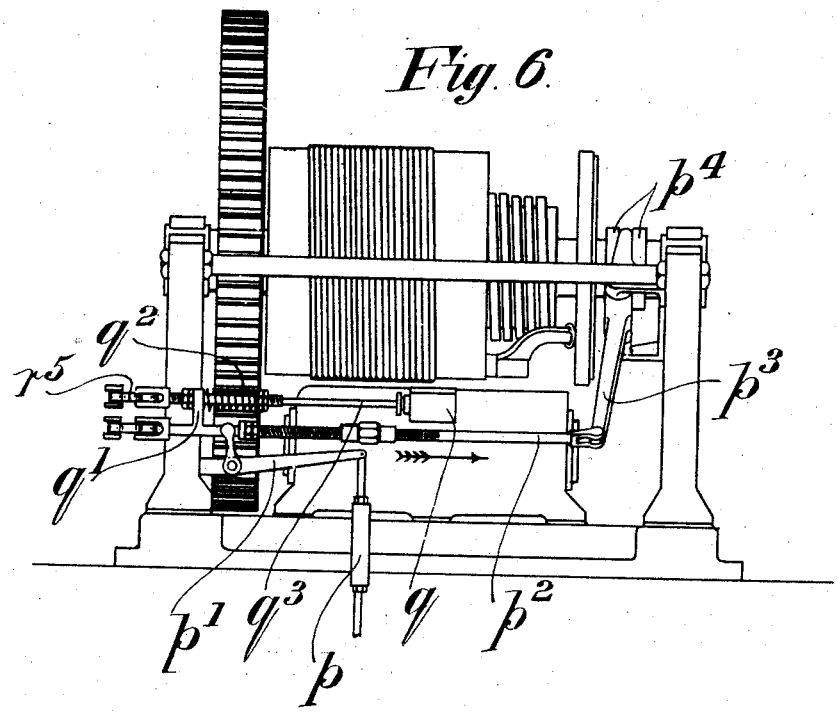

Should it be desired, at any time, to operate the winch by hand then the automatic gear can be disconnected and the clutch and valve manipulated by the hand levers $s$, $s^1$ (Figs. 4 & 5). When the lever $s$ is moved it operates the valve $q$ and when the lever $s^1$ is moved it operates the clutch and these operations must be done in proper sequence. A man usually operates both levers, catching one in each hand, with the result that he must be careful to operate the levers at the proper times. To simplify matters I connect the operating rods $s^2$, $s^3$, (for manipulating the valve rod $q^3$ and the rod $p^2$) together by a strong spring $s^4$ so that when one is operated in either direction it will, after an interval, and owing to the action of the spring, operate the other lever and in this manner the valve and clutch can be operated in proper sequence by merely working one of the levers $s$, $s^1$. Of course this gear would only be used when the automatic gear is disconnected.

Under my present invention I also use a special form of guide for the rock cutter. This guide consists of a platform or flat structure $t$ (Figs. 20 and 21) which is fitted in the well of the vessel and has a circular hole $t^1$ in it for the cutter to pass through. This hole is lined by a hard and renewable metal ring $t^2$ which is larger than the diameter of the cutter and is slightly tapered internally as shown at Fig. 21. At its upper end it has a flange or hoop $t^3$ shrunk on or otherwise secured to it so as to prevent it falling through the hole in the guide and also to allow of its working freely between the springs $t^4$. The flange can slide on the metal plate $t^5$ when the ring oscillates with the movements of the cutter. The springs $t^4$, of which there are preferably six arranged radially round the ring, are inserted into holes in the guide and can be driven, or tightened up, against the ring by means of wedges $t^7$ or by screws and nuts, such as shown at $t^8$ (Fig. 22). The wedges or the screw allow of the springs being adjusted as desired.

Whenever the cutter strikes the rock it oscillates violently and this oscillation is cushioned by the springs $t^4$.

If there are a number of cutters, then of course, the guide would be provided with a corresponding number of buffer or spring rings $t^2$.

I also use an improved construction of cutter. The cutter is made of steel and is tapered at each end, and at its upper end, it is split as at $u$ (Fig. 7) for a certain distance and is also reduced in thickness at $u^1$, $u^1$. The end of the hoisting rope $d$ is inserted between the sides of the split portion (grooves being provided for its reception) and is then held fast by tightly bolting the sides together by bolts $u^2$ as shown clearly at Figs. 7 and 8. The extreme end of the rope may be frayed out or thickened so as to prevent it readily working upwards. With this arrangement the rope is securely clamped or fastened directly to the cutter. At the bottom of the split there may be a transverse hole $u^3$ through which the usual cutter suspending bolt can be passed if so desired.

Figs. 11 to 16 show other methods of securing the hoisting rope $d$ to the cutter. In Figs. 11 and 12 a thimble $v$ is inserted in the split upper end of the cutter the split being made of a suitable width for its reception. The thimble works pivotally on a bolt $v^1$ which latter serves to hold the two parts of the split portion together. The rope $d$ is passed round the thimble and is spliced. To prevent the momentum of the thimble giving a shock to the bolt when the cutter strikes the rock the friction of the sides of the slit or slot will act beneficially, but, besides, I employ a cod piece $v^2$ which fits underneath the rope and can be tightened against it by a wedge pin $v^3$. The tightening of the wedge also locks the parts together so that, when the cutter is hoisted, no motion takes place between the bolt $v^1$, the thimble, or the cod piece $v^2$.

In Figs. 13 and 14 a somewhat similar arrangement to that at Figs. 7 and 8 is shown that is to say the hoisting rope is not secured to a thimble but is fastened or clamped directly to the cutter between the sides of the split portion. In this case I bore a central hole $w$ in the end of the cutter and widen it out at the bottom. The cutter is split and into the hole two tapered grippers $w^1$, $w^1$ are inserted between which the end of the rope $d$ is gripped, as shown. A transverse hole $u^3$ is also made and the extreme end of the rope may be opened out and passed through this hole as shown and then knotted. When the screws $w^2$ are tightened up the grippers are caused to hold the rope with a tight frictional grip and, if desired, in order to increase this grip the grippers may be roughened or serrated. If the rope moves upwards, under the strain of hoisting, the grippers, owing to their wedge shape, close more tightly on the rope. The upper end of each gripper is, preferably, curved outwards, as shown at $w^4$.

In the arrangement Figs. 15, 16, and 17 the rope $d$ is made into a loop at its end which is secured in the split end of the rock cutter $i$. The split portion is made for the reception of the rope $d$ which latter is looped and spliced or else fastened by means of clips $x^1$. When the bolts $x^2$ are tightened up the split parts of the cutter squeeze the rope and thereby hold it firmly in place, and of course, the bolts prevent it being withdrawn. It can be easily withdrawn, when desired, by withdrawing the bolts. If desired the sides of the split may be roughened.

The point $y$ of the cutter may be made as shown at Figs. 18 and 19 that is to say it may have at its upper end an extension or rim $y^1$ which bears against the lower end of the cutter which latter is suitably made for its reception. This rim serves to protect the lower end of the cutter from wear even although the point itself may be worn down to a considerable extent. The dotted line, $y^2$, (Fig. 18) indicates the extent to which the point could be worn without wearing the cutter. The points, when worn, can readily be renewed but the cutter, when worn, is expensive to replace. If desired, instead of having a rim $y^1$ I may employ the usual point and provide the lower end of the cutter itself with a hardened renewable ring $z$, as shown at Figs. 7 and 8. This ring can be shrunk on to the cutter and when worn can be removed and replaced by a new one.

The points are held in place by one or more pins $z^1$ which can be made as shown at Figs. 9 and 10, that is, they may be split and have a round tapered wedge $z^2$ in the split. When the pins are screwed up the wedges are caused to expand the pins and thereby lock them tightly in position so that they will not drop out during the working of the cutter.

The cutter itself is, as heretofore, made of special mild steel turned smooth in a lathe and tapered gradually from the top to the point $z^4$ and then quickly tapered off towards the point $y$ which latter is made of tempered steel and is harder in the center than at the outside in order that it may continue sharp during use. Its contour is similar to the point of an armour piercing shell, or is chisel shaped.

The rock when cut can be easily dredged by an ordinary bucket dredger.

Having now fully described my invention what I claim and desire to secure by Letters Patent is:—

1. In rock cutting apparatus the combination with hoisting means for raising the cutter and allowing it to fall, of means for controlling the action of the hoisting means, said controlling means being set in action by the cutter when it strikes the rock (so as to again raise the cutter) and also when it is raised to a certain height (so as to let the cutter fall again).

2. In rock cutting apparatus the combination with a hoisting winch for raising the cutter and allowing it to fall, of means (set in action by the cutter when it strikes the rock) to automatically actuate a clutch, and, later, the winch-supply valve for actuating the winch so as to raise the cutter and means (set in action by the cutter when it reaches a certain height) for causing the hoisting winch to lower the cutter.

3. In rock cutting apparatus the combination with a hoisting winch for raising the cutter and allowing it to fall of means for automatically first actuating a clutch and later the winch-supply valve causing the winch to raise the cutter just after it strikes the rock and automatic means for causing the winch to drop the cutter when it is raised to a certain height.

4. In rock cutting apparatus the combination with a winch operated by fluid pressure for raising the cutter and allowing it to fall of means set in action by the cutter when it strikes the rock for automatically opening the fluid supply valve of the winch and means set in action by the cutter when it reaches a certain height, for automatically closing the fluid supply valve of the winch.

5. In rock cutting apparatus the combination with a steam winch for raising the cutter and allowing it to fall of means set in action by the cutter when it strikes the rock for automatically opening the steam supply valve of the winch and means set in action by the cutter when it reaches a certain height for automatically closing the steam supply valve of the winch.

6. In rock cutting apparatus the combination with a winch operated by pressure fluid for raising the cutter and allowing it to fall, said winch being provided with a winding drum having a rope thereon connected to the cutter and with a clutch for putting the drum into and out of gear, of means set in action by the cutter when it strikes the rock for automatically engaging the clutch and opening the fluid supply valve of the winch and means set in action by the cutter when it reaches a certain height for automatically closing the fluid supply valve of the winch and disengaging the clutch.

7. A rock cutting apparatus comprising, in combination, a structure, an erection thereon, a rock cutter, hoisting means for raising the rock cutter and allowing it to fall, and means constructed to be set in motion by the cutter to actuate first a clutch and then means for controlling the hoisting means so that the cutter can be raised and dropped automatically.

8. A rock cutting apparatus comprising, in combination, a structure, an erection thereon, a rock cutter, hoisting means for raising the rock cutter and allowing it to fall, and means (set in action by the cutter when it strikes the rock to automatically actuate a clutch, and, later, means) for causing said hoisting means to raise the cutter and means (set in action by the cutter when it is raised to a certain height) for causing said hoisting means to drop the cutter.

9. A rock cutting apparatus comprising, in combination, a structure, an erection thereon, a rock cutter, a power winch for raising the rock cutter and allowing it to fall, means operated by the rock cutter for automatically shutting off the power from the winch and means operated by the cutter, for automatically supplying power to the winch.

10. A rock cutting apparatus comprising, in combination, a structure, an erection thereon, a rock cutter, a power winch for raising the rock cutter and allowing it to fall, means operated by the rock cutter whenever it reaches a certain height for automatically shutting off the power from the winch and means operated by the kinking of the hoisting rope for automatically supplying power to the winch whenever the cutter strikes the rock.

11. A rock cutting apparatus comprising, in combination, a structure, an erection thereon, a rock cutter, a power winch for raising the rock cutter and allowing it to fall and automatic means for shutting off the power to the winch whenever the cutter rises a certain height.

12. A rock cutting apparatus comprising, in combination, a structure, an erection thereon, a rock cutter, a power winch for raising the rock cutter and allowing it to fall, a clutch on the winch and automatic means for shutting off the power from the winch and also releasing the clutch whenever the cutter rises a certain height.

13. A rock cutting apparatus comprising, in combination, a structure, an erection thereon, a rock cutter, a power winch for raising the rock cutter and allowing it to fall, a power supply valve on the winch, a clutch on the winch, and automatic means for closing said supply valve and also releasing said clutch whenever the cutter rises a certain height.

14. A rock cutting apparatus comprising, in combination, a structure, an erection thereon, a rock cutter, a steam winch for raising the rock cutter and allowing it to fall, a steam valve on the winch, a clutch on the winch and automatic means for closing the steam valve and subsequently disengaging the clutch whenever the cutter rises a certain height.

15. A rock cutting apparatus comprising, in combination, a structure, an erection thereon, a rock cutter, a steam hoisting winch, means connecting the winch with the cutter, a steam valve on the winch, a lever on the erection and means connecting the lever with the said steam valve.

16. A rock cutting apparatus comprising, in combination, a structure, an erection thereon, a rock cutter, a steam hoisting winch, means connecting the winch with the cutter, a steam valve on the winch, and means connecting the said lever with the steam valve so that when the top of the cutter strikes against the lever it will operate the steam valve.

17. A rock cutting apparatus comprising, in combination, a structure, an erection thereon, a rock cutter, a steam hoisting winch, means connecting the winch with the cutter, a steam valve on the winch, a clutch on the winch, a lever on the erection, means connecting said lever with the steam valve, a swinging arm on the erection and means connecting said arm with the winch clutch.

18. A rock cutting apparatus comprising, in combination, a structure, an erection thereon, a rock cutter, a steam hoisting winch, means connecting the winch with the cutter, a steam valve on the winch, a valve rod, a spring thereon, a clutch on the winch, a clutch lever, a rod connected with the clutch lever, an arm on the rod and acting on the aforesaid spring, a bell crank, a swinging arm on the erection, means connecting said bell crank with the swinging arm, a lever on the erection and means connecting said lever with the said valve rod.

19. A rock cutting apparatus comprising, in combination, a structure, an erection thereon, a rock cutter, a steam hoisting winch, means connecting the winch with the cutter, a steam valve on the winch, a valve rod, a spring thereon, a clutch on the winch, a clutch lever, a rod connected with the clutch lever, an arm on the rod and acting on the aforesaid spring, a bell crank, a swinging arm on the erection, means connecting said bell crank with the swinging arm, a lever on the erection, means connecting said lever with the said valve rod, hand lever gear for operating the valve rod, hand lever gear for operating the clutch rod, and elastic means connecting said gears together.

20. A rock cutting apparatus comprising, in combination, a structure, an erection thereon, a rock cutter with an opening at its upper end, a hoisting rope having its end fitted in the opening, means for holding the rope in the opening, a winch, a clutch and a supply valve operable in succession by the cutter when it strikes a rock and means for operating the winch.

21. A rock cutting apparatus comprising, in combination, a structure, an erection thereon, a rock cutter having an opening at its upper end, a hoisting rope having its end fitted in the opening, grips, means for tightening the grips upon the end of the rope, a winch, a clutch and a supply valve operable in succession by the cutter when it strikes a rock and means for operating the winch.

22. In a rock cutting apparatus, a rock cutter split at its upper end, a hoisting rope connected to the cutter with its ends extended through the split, and means engaging the rope for clamping the same in the split of the cutter.

23. A rock cutting apparatus having a tapered metal rock cutter, a hoisting rope, means for fastening the rope to the cutter, and a renewable shell-shaped point with an annular rim at its upper end on the cutter.

24. A rock cutting apparatus comprising, in combination, a structure, an erection thereon, a rock cutter made of steel and tapered, a hoisting rope fastened direct to the cutter, a renewable shell point on the cutter, a protecting ring ($z$) on the cutter and means for raising and lowering the cutter.

25. A rock cutter comprising, in combination, a solid metal body which is tapered and split at its upper end, means for closing the split on to the hoisting rope, a renewable shell point and a protecting ring.

26. A rock cutting apparatus comprising, in combination, a structure, an erection thereon, a rock cutter, a guide for the cutter, means for cushioning the cutter in the guide, means for raising the cutter and allowing it to fall, and means for operating said raising means.

27. A rock cutting apparatus comprising, in combination, a structure, an erection thereon, a rock cutter, a guide with hole therein, a ring movably fitted in the hole, springs acting on the ring, means for adjusting the springs, means for operating the cutter and means for controlling said operating means.

28. A rock cutting apparatus comprising, in combination, a structure, an erection thereon, a rock cutter, a guide with a hole therein, a tapered ring movably fitted in the hole, springs acting on the ring, wedges for adjusting the springs, means for operating the cutter, and means for controlling said operating means.

29. In a rock cutting apparatus, the combination with hoisting means for raising the cutter and allowing it to fall, of means for controlling the action of the hoisting means, said controlling means being set in action by the cutter when it strikes a rock to automatically actuate a clutch and operate a valve (so as to again raise the cutter), and also when it is raised to a certain height (so as to let the cutter fall again).

30. A rock cutting apparatus having a rock cutter with an opening in its upper end and a transverse outlet therefrom, a hoisting rope having its end fitted in said opening and a portion passed through said transverse outlet, and means for holding the rope in said opening.

In testimony whereof I affix my signature in presence of two witnesses.

FRED LOBNITZ.

Witnesses:
   JAMES R. WOOD,
   THOS. MILLER.